March 30, 1948.  P. H. HARRER  2,438,749
HITCH
Filed Sept. 30, 1944

Inventor
Paul H. Harrer
by W. A. Lieber
Attorney

Patented Mar. 30, 1948

2,438,749

UNITED STATES PATENT OFFICE 2,438,749

HITCH

Paul H. Harrer, La Porte, Ind., assignor to Allis-Chalmers Manufacturing Company, Milwaukee, Wis., a corporation of Delaware Application September 30, 1944, Serial No. 556,581

4 Claims. (Cl. 280—33.17)

The present invention relates generally to improvements in hitches and relates more particularly to improvements in the construction and operation of tractor trailer hitches or couplings of the ball and socket type.

It has long been customary to hitch various devices to be hauled (hereinafter designated as trailers) to sources of driving power such as tractors, automobiles or the like (hereinafter designated as prime movers). Because the steering in such instances is normally accomplished through the prime mover and also since the terrain over which the trailer is hauled is frequently uneven, the hitch or coupling for the trailer is ordinarily so constructed as to permit universal movement between the trailer and the prime mover. Furthermore, since very heavy loads are often imposed on such hitches every effort has been made to construct them of a minimum number of sturdy working parts and with all parts placed in parallel or straight line relationship so that a longitudinal pull is imposed thereon. The most commonly used trailer hitches to date have been of the ball and socket type, and many modifications of ball and socket type hitches have heretofore been proposed in an effort to provide simplicity, compactness, ready attachment and detachment, strength and durability in the design.

It is an object of the present invention to provide an improved hitch of the ball and socket type which meets the foregoing requirements and which is simple and compact in construction and highly efficient in operation.

Another object of this invention is to provide an improved universal trailer hitch by means of which the trailer may be quickly and easily attached or detached from the prime mover by a novice.

Another object of the present invention is to provide an improved hitch or coupling which may be readily disconnected or assembled and locked in assembled condition and which is moreover strong and durable.

Another object of my invention is to provide an improved trailer hitch which may be manufactured and sold at moderate cost and wherein all parts are readily accessible and may be quickly replaced.

Another object of the present invention is to provide a trailer hitch comprising a socket member provided with lugs and adapted to receive a ball element and means formed for cooperation with the lugs of the socket member and with the ball element to retain the ball element within the socket member.

A further object of the present invention is to provide a trailer hitch comprising a socket member provided with peripheral lugs and adapted to receive a ball element and a retainer member formed for cooperation with the lugs and with the ball element for retaining the element within the socket member when said members are interlocked upon partial rotation of one relative to the other.

An additional object of the present invention is to provide a trailer hitch comprising a socket member, a ball element adapted to fit within the socket member, and an annular member embracing the ball element and cooperable with the socket member to form a gun lock or bayonet joint therewith for retaining the ball element within the socket.

These and other specific objects and advantages of the present invention will be apparent from the following detailed description.

A clear conception of the features constituting the present improvement and of the mode of constructing and of utilizing devices built in accordance with my invention may be had by referring to the drawing accompanying and forming a part of this specification, wherein like reference characters designate the same or similar parts in the various views.

Figure 1:
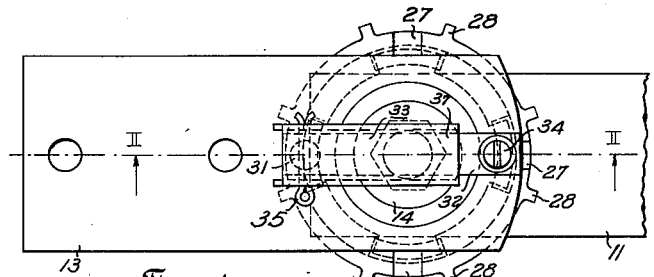
Fig. 1 is a plan view of the completely assembled hitch.

Referring to the drawing, my improved device comprises in general, a structure or a tractor drawbar 11 carrying a ball element 12, a structure or a trailer drawbar 13 provided with a socket member 14, and a ring member 15 embracing the ball element 12 and carried thereby.

Figure 2:
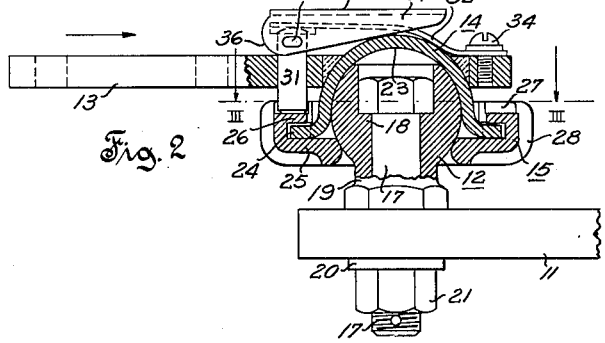
Fig. 2 is a vertical part sectional view of the assembly taken along the line II—II of Fig. 1.
Figure 6:
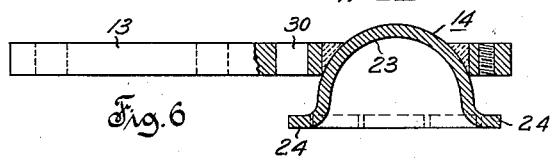
Fig. 6 is a vertical part sectional view taken along the line VI—VI of Fig. 5.
Figure 5:
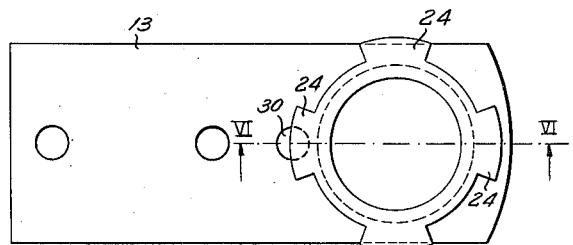
Fig. 5 is a bottom view of the trailer drawbar and socket member.

The ball element 12 is preferably detachably connected to the drawbar 11 by means of a bolt 17 recessed in the head or ball portion 18 of the element 12 and depending from the shank portion 19 thereof a sufficient distance to pass through a hole provided in the drawbar 11 and receive a washer 20 and nut 21 as shown in Fig. 2. The socket member 14, which may be welded to the drawbar 13 or formed integral therewith, is provided with a spherical socket 23 adapted to receive the ball 18 of the element 12 and with a series of outwardly extending peripheral lugs 24, as clearly illustrated in Fig. 5. The ring member 15 is formed with an inwardly extending lower peripheral flange or collar 25 of smaller inner diameter than the diameter of the ball 18 to permit seating engagement therewith and of somewhat larger diameter than that of the shank portion 19 of the element 12 to allow for relatively free movement with respect thereto. The ring member 15 is also provided with a series of inwardly extending upper peripheral lugs 26 formed for interlocking engagement with the lugs 24 of the member 14 and each having a radial groove 27 in the upper surface thereof, and a suitable number of ribs 28 may be provided on the outer surface of the ring member 15 for gripping purposes upon rotation thereof as will be hereinafter described.

The drawbar 13 is provided with a bore 30 through which extends an axially movable locking pin 31. The pin 31 is retained in position within the bore 30 by means of a spring 32 and cam element 33, the spring 32 being attached at one end to the drawbar 13 by means of a screw 34 with the free end thereof exerting a downward pressure on the pin 31 and the cam element 33 being rotatably attached to the pin 31 by means of a cotter pin 35 or the like forming the cam axis with the cam surface 36 coacting directly with the upper surface of the drawbar 13 to limit the downward movement of the pin 31. The cam element 33 is preferably of inverted U-shaped formation with an elongated portion 37 extending away from the cam surface 36 to form a convenient manipulating lever as well as a protective cover for the spring 32 when in normal position, as illustrated in the drawing.

The improved hitch may be readily assembled in the following manner. The ball element 12 is secured to the drawbar 11 in an obvious manner by means of the bolt 17, washer 20 and nut 21 after the ring member 15 has been properly positioned surrounding the shank 19 of the element 12 and with the inwardly extending lugs 26 of the member 15 facing the ball 18. After the cam element 33 has been pivotally attached to the locking pin 31 by means of a cotter pin 35 or the like, the pin 31 is inserted into the bore 30 with the cam surface 36 resting upon the top surface of the drawbar 13. With the cam lever 37 in raised position away from the socket member 14, the spring 32 may be secured to the drawbar 13 by means of the screw 34 with the free end of the spring 32 pressing downwardly on the upper end of the pin 31 to retain the pin within the bore 30. After the parts have been thus assembled, the drawbars 11, 13 are securely bolted or otherwise attached to the prime mover and trailer respectively and the hitch is then ready for use.

Figure 9:
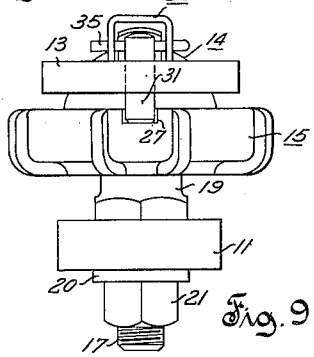
Fig. 9 is an end view of the assembled hitch looking in the direction of the arrow.
Figure 4:
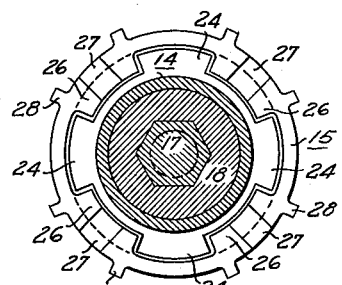
Fig. 4 is a section similar to that of Fig. 3 but showing the hitch elements in open position prior to interlocking thereof.
Figure 3:
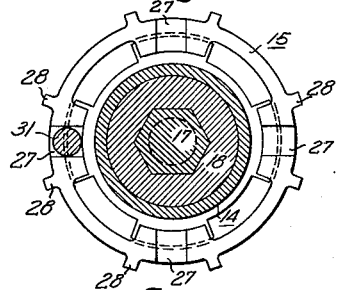
Fig. 3 is a horizontal section taken along the line III—III of Fig. 2 showing the hitch elements in interlocking engagement.
Figure 7:
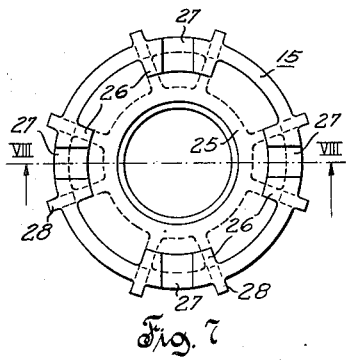
Fig. 7 is a plan view of the hitch retainer ring.
Figure 8:
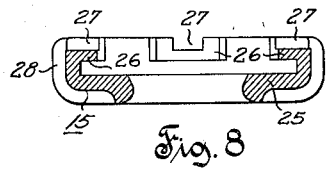
Fig. 8 is a horizontal section taken along the line VIII—VIII of Fig. 7.

To connect the trailer to the prime mover by means of the hitch, the socket member 14 is placed over the ball element 12 with the ball 18 cupped in the spherical socket 23. The locking pin 31 is then raised by rotating the cam element 33 so that its lever 37 is in a substantially vertical position. Next, the ring member 15 is raised until the inwardly extending lugs 26 thereof have been passed through the recesses formed between the outwardly extending lugs 24 of the socket member 14 as shown in Fig. 4. Upon partial rotation of the ring member 15 in either direction about its axis which is coincident with that of the member 14, the members 14, 15 are interlocked as in a bayonet joint with the lugs 24, 26 superimposed as illustrated in Figs. 1, 2 and 3 of the drawing, thereby retaining the ball 18 in the socket 23 by virtue of the collar 25 which seats against the ball 18. To prevent further rotation and disengagement of the members when in interlocking engagement, the cam element 33 is rotated to the position shown in Figs. 1, 2 and 9 with the free end of the pin 31 being forced into the groove 27 of the lug 26.

To disconnect the hitch, the cam lever 37 is raised and the ring member 15 is rotated until the lugs 26 are again free to pass between the lugs 24 and out of engagement therewith. The ball 18 is then removed from the socket 23 and the prime mover is free of the trailer.

From the foregoing detailed description, it will be apparent that the present invention provides an improved hitch for diverse purposes which is simple and compact in construction and operation, which is quickly and easily connected or disconnected in a few simple operations, wherein all parts are readily accessible and may be quickly replaced, which is strong and durable, and in which the parts may be positively locked. The ball and socket arrangement permits universal movement between the trailer and the prime mover, and the drawbars are in parallel relationship during normal hauling operations.

The ribs 28 obviously aid the operator to grip the ring member for rotation thereof and any number of these ribs may be provided. Likewise, while four cooperating lugs have been shown on each of the members 14, 15, a greater or lesser number of lugs may be provided as desired without departing from the scope of my invention. It should be noted, however, that while the lugs and the spaces therebetween must be designed to permit clearance for the parts, the greatest locking effect is obtained when the lugs and the spaces between the lugs are approximately equal, resulting in a greater bearing surface when the lugs are interlocked.

The term "prime mover" as used herein is meant to apply to any means which might be utilized for hauling purposes, and the term "trailer" is likewise used in its broadest form and is meant to cover anything which is hauled or dragged behind.

It should therefore be understood that it is not desired to limit the present invention to the exact details of construction or the precise mode of operation herein shown and described, for various modifications within the scope of the claims may occur to persons skilled in the art.

It is claimed and desired to secure by Letters Patent:

1. A trailer hitch of the ball and socket type comprising, a socket member provided with a series of outwardly extending peripheral lugs, a ball element formed for reception within said socket member, a ring member provided with a series of inwardly extending lugs, said socket lugs and said ring lugs being formed for interlocking engagement to retain said ball element within said socket member, a locking pin engageable with a lug of said ring member for preventing disengagement of said lugs when interlocked, spring means for constantly urging said locking pin toward engagement with said ring lug, and cam means for moving said pin into and out of engagement with said lug.

2. A hitch of the ball and socket type detachably connecting a first structure and a second structure, comprising a socket member attached to said first structure and provided with a series of outwardly extending peripheral lugs, a ball member attached to said second structure and formed for reception in said socket member with free angular sliding contact between said ball and socket members, an annular retaining member embracing said ball member and provided with a series of inwardly extending lugs and a locking recess, the lugs on said socket member and said annular member being formed for interlocking engagement to retain said ball member and said socket member in operative relation, a locking element adapted to enter into locking position within said locking recess and being biased toward locking position therein, and an actuating device operatively associated with said locking element and having a manipulable portion mounted on said first structure and disposed at a point where it may be readily manipulated from the upper side of said first structure to effect release of said locking element from said locking recess.

3. A hitch of the ball and socket type detachably connecting a first structure and a second structure, comprising a socket member attached to said first structure and provided with a series of outwardly extending peripheral lugs, a ball member attached to said second structure and formed for reception in said socket member with free angular sliding contact between said ball and socket members, an annular retaining member embracing said ball member and provided with a series of inwardly extending lugs and a locking recess, the lugs on said socket member and said annular member being formed for interlocking engagement to retain said ball member and said socket member in operative relation, a locking element adapted to enter into locking engagement within said locking recess, and means for actuating said locking element, said means being carried by said first structure and including a resilient device for biasing said locking element into locking position within said recess, and a manipulable portion mounted on the upper side of and being operatively engageable with a portion of said first structure to cause actuation of said locking element out of said locking recess.

4. A hitch of the ball and socket type detachably connecting a first structure and a second structure, comprising a socket member attached to said first structure and provided with a series of outwardly extending peripheral lugs, a ball member attached to said second structure and formed for reception in said socket member with free angular sliding contact between said ball and socket members, an annular retaining member embracing said ball member and provided with a series of inwardly extending lugs and a locking recess, the lugs on said socket member and said annular member being formed for interlocking engagement to retain said ball member and said socket member in operative relation, a locking element adapted to enter into locking engagement within said locking recess, and means for actuating said locking element, said means being carried by said first structure and including a resilient device for biasing said locking element into locking position within said recess, and a manipulable portion disposed in position where it may be readily actuated from the upper side of said first structure and having a cam surface operatively engageable with a portion of said first structure operative to cause actuation of said locking element out of said locking recess.

PAUL H. HARRER.

REFERENCES CITED

The following references are of record in the file of this patent:

UNITED STATES PATENTS

| Number | Name | Date |
| --- | --- | --- |
| 1,587,074 | Humphry | June 1, 1926 |
| 2,202,753 | Bugatti | May 28, 1940 |

FOREIGN PATENTS

| Number | Country | Date |
| --- | --- | --- |
| 180,555 | Switzerland | Jan. 16, 1936 |